United States Patent
Oka et al.

(10) Patent No.: US 7,698,740 B2
(45) Date of Patent: Apr. 13, 2010

(54) SEQUENTIAL DATA EXAMINATION METHOD USING EIGEN CO-OCCURRENCE MATRIX FOR MASQUERADE DETECTION

(75) Inventors: Mizuki Oka, Tsukuba (JP); Kazuhiko Kato, Tsukuba (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 1219 days.

(21) Appl. No.: 11/179,838

(22) Filed: Jul. 12, 2005

(65) Prior Publication Data
US 2006/0069955 A1    Mar. 30, 2006

(30) Foreign Application Priority Data
Sep. 10, 2004    (JP) .............................. 2004-264758

(51) Int. Cl.
G06F 11/00    (2006.01)
G06F 12/14    (2006.01)
G06F 12/16    (2006.01)
G08B 23/00    (2006.01)

(52) U.S. Cl. ........................................ 726/22; 704/256
(58) Field of Classification Search .................. 726/22; 704/251, 256, 256.1
See application file for complete search history.

(56) References Cited

U.S. PATENT DOCUMENTS

| | | | | |
|---|---|---|---|---|
| 5,651,077 | A * | 7/1997 | Dong et al. ................. | 382/172 |
| 6,438,493 | B1 * | 8/2002 | West et al. ..................... | 702/2 |
| 6,560,540 | B2 * | 5/2003 | West et al. .................... | 702/14 |
| 6,886,010 | B2 * | 4/2005 | Kostoff ........................... | 707/3 |
| 7,373,612 | B2 * | 5/2008 | Risch et al. .................. | 715/850 |
| 2002/0042677 | A1 * | 4/2002 | West et al. .................... | 702/14 |
| 2002/0183932 | A1 * | 12/2002 | West et al. .................... | 702/14 |
| 2004/0064438 | A1 * | 4/2004 | Kostoff ........................... | 707/1 |

FOREIGN PATENT DOCUMENTS

| | | |
|---|---|---|
| JP | 08-251403 | 9/1996 |
| JP | 11-066310 | 3/1999 |
| JP | 2001-338264 | 12/2001 |
| JP | 2002-014999 | 1/2002 |
| JP | 2002-323371 | 11/2002 |
| JP | 2004-164036 | 6/2004 |

OTHER PUBLICATIONS

Oka et al., Anomaly Detection Using Layered Networks Based on Eigen Co-occurrence Matrix, Sep. 2004, Springer-Verlag.*

(Continued)

*Primary Examiner*—David Garcia Cervetti
(74) *Attorney, Agent, or Firm*—Rankin, Hill & Clark LLP

(57) ABSTRACT

The present invention aims at providing a sequential data examination method which can increase data examination accuracy compared with the prior art. The similarity is calculated between a layered network model generated from learning sequential data to be learned and a layered network model generated from testing sequential data to be tested. Based on the similarity, it is determined whether or not the testing sequential data to be tested belong to one or more categories. A network model for each layer of the layered network model is constructed by multiplying an element of the feature vector and its corresponding Eigen co-occurrence matrix.

11 Claims, 10 Drawing Sheets

OTHER PUBLICATIONS

Oka et al., Eigen Co-occurrence Matrix Method for Masquerade Detection, Mar. 2004, The 7th JSSST SIGSYS Workshop on Systems for Programming and Applications (SPA2004), Nagano, Japan.*

Oka et al., Eigen Co-occurrence Matrix (ECM): Method for Extracting Features of Sequential Data as Layered Networks, Jul. 13, 2004, Japan, GMT+9.*

Nong Ye et al., "Probabilistic Techniques for Intrusion Detection Based on Computer Audit Data", IEEE Transactions on Systems, Man, and Cybernetics—Part A: systems and Humans, vol. 31, No. 4, Jul. 2001, pp. 266-274.

Steven A. Hofmeyr et al., "Intrusion Detection using Sequences of System Calls", Dept. of Computer Science, University of New Mexico, Albuquerque, NM Aug. 18, 1998, pp. 1-25.

Wenke Lee et al., "A Framework for Constructing Features and Models for Intrusion Detection Systems", ACM Transactions on Information and System Security, vol. 3, No. 4, Nov. 2000, pp. 227-261.

Naji Habra et al., "ASAX: Software Architecture and Rule-Based Language for Universal Audit Trail Analysis", Proceedings of ESORICS'92, Nov. 23-25 Toulouse, Springer-Verlag 1992.

R. Sekar et al., "A Fast Automaton-Based Method for Detecting Anomalous Program Behaviors", State University of New York, Stony Brook, NY 11794, 2001.

William DuMouchel, "NISS Computer Intrusion Detection Based on Bayes Factors for Comparing Command Transition Probabilities", Technical Report No. 91, Feb. 1999, National Institute of Statistical Sciences.

Roy A. Maxion et al., "Masquerade Detection Using Truncated Command Lines", International Conference on Dependable Systems & networks: Washington, D>C. Jun. 23-26, 2002, pp. 219-228.

Anup K. Ghosh et al., "A Study in Using Neural Networks for Anomaly and Misuse Detection", Proceedings of the 8th USENIX Security Symposium, Washington, D.C., Aug. 23-26, 1999.

S. Jha et al., "Markov Chains, Classifiers, and Intrusion Detection", Proceedings of the 14th IEEE Computer Security Foundations Workshop, 2001.

Christina Warrender, "Detecting Intrusions Using System Calls: Alternative Data Models", IEEE Symposium on Security and Privach, IEEE Computer Society pp. 133-145 (1999).

Mizuki Oka et al., "Eigen Co-occurrence Matrix Method for Masquerade Detection", Master's Program in Science and Engineering, University of Tsukuba . . . , 2004.

* cited by examiner

E =

E =

SEQUENTIAL DATA EXAMINATION METHOD USING EIGEN CO-OCCURRENCE MATRIX FOR MASQUERADE DETECTION

BACKGROUND OF THE INVENTION

The present invention relates to a sequential data examination method of determining whether or not sequential data belong to one or more categories.

In order to detect so-called "masquerade or spoofing" which gains an unauthorized access to a computer by stealing the password from a user and pretending to be that user, it is effective to use an anomaly detection system to examine if there is any anomaly in sequential data entered into the computer, namely, if the entered sequential data have been created by the masquerader or spoofer. Typically, a conventional anomaly detection system first creates a profile defining a normal user's behavior (features appearing in the user-created sequential data). It then determines whether or not the entered sequential data have been created by a normal user or masquerader by comparing a profile of entered sequential data to be tested with that of that user.

The sequential data to be tested typically include issued UNIX (registered trademark) commands and accessed files. The process of identifying the entered sequential data as normal or anomalous is divided into two steps. At the first step, features are extracted from the sequential data. At the second step, the extracted features are identified as normal or anomalous.

Typical conventional techniques of performing feature extraction (the first step) are "Histogram" and "N-grams". In the histogram technique, frequency vectors of observed events within the sequential data are feature vectors. In the N-grams technique, N consecutive events are defined as one feature. [Non-Patent Documents 1 to 3]

Various approaches have been proposed as a technique of performing the second step, namely, identifying the extracted features as normal or anomalous. Such approaches typically include "Rule-based" [Non-patent Document 4], "Automaton" [Non-patent Document 5], "Bayesian Network" [Non-patent Document 6], "Naive Bayes" [Non-Patent Document 7], "Neural Network" [Non-patent Document 8], "Markov Model" [Non-patent Document 9], and "Hidden Markov Model" [Non-patent Document 10].

The inventors of the present invention have proposed another method called "Eigen Co-occurrence Matrix (ECM)" which captures dynamic information on a user's behavior and extracts features from the user's sequential data [Non-patent Document 11]. The ECM approach correlates events while taking account of the sequential data. The event correlation focuses on the event pair and represents correlations of all event pairs as co-occurrence matrices. In the co-occurrence matrix, the strength of the correlation of each event pair is represented by the distance over which the event pair spreads and the frequency at which that event pair occurs.

In the approach using the histogram, the feature is defined as a frequency vector of item (event) occurrences within a sequence. In the approach using the N-grams, the feature is defined as N consecutive items (events). There are problems with these conventional approaches. Dynamic information on a user's behavior appearing in the sequential data is not available. In other words, information on the user's behavior within a sequence, namely, characteristic features of each user defined by the types of events appearing within his/her sequence and the appearing order of these events are not available or dynamic information on the user's behavior is lost. In addition, only the features of a single event or adjacent events are available or only the features between adjacent events can be represented.

When using the ECM method proposed by the inventors of the present invention to identify an authorized user and masquerader, it is appropriate to employ a statistical pattern recognition technique in which a co-occurrence matrix is handled as a pattern. The most simplest pattern recognition is a technique based on pattern matching. When handling co-occurrence matrices as patterns, the patterns become highly dimensional. In the pattern matching, it is effective to extract features (which leads to compressed information) for pattern recognition. The specific technique proposed by the inventors of the present invention determines whether or not sequential data belong to one or more categories (or sequential data have been created by an authorized user) by computing the feature vectors from co-occurrence matrices and checking with a specified vector identification function to see if the Euclid distance between the sequential data and the reference feature vectors used for determination is below a threshold. Although this technique attains certain checking accuracy, there is a limit to improvement of the checking accuracy.

The non-patent documents referred to herein are:

[Non-patent Document 1] Ye, X. Li, Q. Chen, S. M. Emran, and M. Xu; "Probablistic Techniques for Intrusion Detection Based on Computer Audit Data"; IEEE Transactions of Systems Man and Cybernetics, Vol. 31, pp. 266-274, 2001

[Non-patent Document 2] S. A. Hofmeyr, S. Forrest and A. Somayaji; "Intrusion Detection using Sequences of System Calls"; Journal of Computer Security, vol. 6, pp. 151-180, 1998

[Non-patent Document 3] W. Lee and S. J. Stolfo; "A framework for constructing features and models for intrusion detection systems"; Information and Systems Security, vol. 3, pp. 227-261, 200

[Non-patent Document 4] N. Habra, B. L. Charlier, A. Mounji, and I. Mathieu; "ASAX: Software Architecture and Rule-Based Language for Universal Audit Trail Analysis"; In Proc. of European Symposium on Research in Computer Security (ESORICS), pp. 435-450, 1992

[Non-patent Document 5] R. Sekar, M. Bendre, and P. Bollineni; "A Fast Automaton Based Method for Detecting Anomalous Program Behaviors"; In Proceedings of the 2001 IEEE Symposium on Security and Privacy, pp. 144-155, Oakland, May 2001

[Non-patent Document 6] W. DuMouchel; "Computer Intrusion Detection Based on Bayes Factors for Comparing Command Transition Probabilities"; Technical Report TR91, National Institute of Statistical Science (NISS), 1999

[Non-patent Document 7] R. A. Maxion and T. N. Townsend; "Masquerade Detection Using Truncated Command Lines"; In Prof. of the International Conference on Dependable Systems and Networks (DSN-02), pp. 219-228, 2002

[Non-patent Document 8] A. K. Ghosh, A. Schwartzbard, and M. Schatz; "A study in using neural networks for anomaly and misuse detection"; In Proc. of USENIX Security Symposium, pp. 141-151, 1999

[Non-patent Document 9] J. S. Tan, K. M. C., and R. A. Maxion; "Markov Chains, Classifiers and Intrusion Detection"; In Proc. of 14th IEEE Computer Security Foundations Workshop, pp. 206-219, 2001

[Non-patent Document 10] C. Warrender, S. Forresto, and B. A. Pearlmutter; "Detecting Intrusions using System Calls: Alternative Data Models"; In IEEE Symposium on Security and Privacy, pp. 133-145, 1999

[Non-patent Document 11] Mizuki Oka, Yoshihiro Oyama, and Kazuhiko Kato; "Eigen Co-occurrence Matrix Method for Masquerade Detection"; In Proceedings of 7th Programming and Applied Systems Workshop sponsored by Software Academy of Japan on Mar. 1, 2004

SUMMARY OF THE INVENTION

An object of the present invention is to provide a sequential data examination method which can increase the data examination accuracy compared with the prior art.

Another object of the present invention is to provide an anomaly detection method of determining if there is any anomaly in sequential data.

The present invention has been achieved based on the development of the Eigen Co-occurrence Matrix (ECM) Method. The ECM Method first correlates events within a sequence with consideration given to sequential data or time series data. This correlating process focuses on the correlation between two events and represents the correlation for every event pair as a co-occurrence matrix. The co-occurrence matrix is capable of representing the correlations between any two events appearing within a sequence (sequential data). The correlations between any two events are the features of the sequential data that could not be represented by the histogram or n-grams technique. The present invention performs principal component analysis upon the co-occurrence matrices to generate a space in which orthogonal principal component vectors exist (principal component vector space). From the respective co-occurrence matrices, features are extracted as vectors in the principal component vector space. Therefore, various vector functions can be used for the extracted features as vectors.

A sequential data examination method according to the present invention uses a feature extraction technique and identification technique to determine whether or not sequential data including a plurality of types of events belong to one or more categories. Especially, in the present invention, a statistical feature extraction technique is employed as the feature extraction technique. This technique uses co-occurrence matrix data which have been converted from a plurality of sequential input data and represent correlations between any two types of events included in a plurality of types of events. An identification technique employed in the present invention uses the extracted feature vectors for identification. In this specification, a plurality of types of events refer to a plurality of items constructing sequential data. When the sequential data are constructed from a plurality of commands, the respective commands are events. A category refers to a concept meaning the type of sequential data in a sense of higher level conception, and a concept meaning the type which a collection of feature vectors obtained from the sequential data belong to in a sense of lower level conception. The feature vectors will be described later. For example, whether or not certain sequential data are normal or anomalous is determined according to whether or not the sequential data belong to one or more predetermined or specified categories. In view of the relationship between the feature vectors and category, a category corresponds to a partial area of a space in which the feature vectors exist.

The co-occurrence matrix employed in the present invention can represent the correlations between any two events (event pair) appearing within a sequence (sequential data). In other words, the co-occurrence matrix represents the strength of the event pair correlation on each event pair by the distance between two events (event pair) and the frequency of occurrences of the event pair. According to the present invention, therefore, whether or not the sequential data belong to one or more specified categories can be determined using dynamic information included in the sequential data, with higher accuracy than the prior art.

When converting a plurality of sequential input data into co-occurrence matrix data, a window data decomposition step, a scope data extraction step, and a co-occurrence matrix conversion step are performed. At the window data decomposition step, the sequential input data are decomposed into a plurality of window data having a predetermined data length. The window data length may be determined depending upon the length of the specified sequential data. At the scope data extraction step, a plurality of scope data having a shorter data length than that of the window data are lag sequentially extracted or sequentially extracted with a time lag from the window data. Specifically, at the scope data extraction step, one or more scope data can be extracted for events of one type relative to a reference position which is defined as a position within the window where events of the one type selected from the plurality of types of events are included. At the co-occurrence matrix conversion step, the plurality of window data are converted to a plurality of co-occurrence matrices which indicate the strength of the time series correlations between the plurality of types of events included in the window data, based on the plurality of scope data. Specifically at the co-occurrence matrix conversion step, in respect of one type of event, the total number of events of this one type which are included in one or more scope data is defined as the frequency of occurrences of the events of that one type. In addition, the total number of events of another type which are included in one or more scope data is defined as the frequency of occurrences of the events of that another type. Then, this frequency of occurrences is defined as a value indicating the strength of the correlation between events of one type and those of the same or different one type. With this arrangement, co-occurrence matrices can be obtained that indicate more accurately the correlations between the events within a sequence.

When using a method of the present invention to distinguish an authorized user from a masquerader or spoofer, it is appropriate to handle co-occurrence matrices as patterns and to employ a statistical pattern recognition (identification) technique. The most simplest pattern recognition (identification) is a technique based pattern matching. When the co-occurrence matrices are handled as patterns, the patterns become highly dimensional. For this reason, it is more effective in pattern matching to extract features (which leads to compressed information) for pattern recognition. By effectively extracting features from the patterns, robust recognition of varied input patterns can be expected. More specifically, the sequential data examination method of the present invention employs principal component analysis as a feature extraction method for extracting feature vectors from the co-occurrence matrices. The principal component analysis is a statistical feature extraction method which enables vector-type data to be represented with a small number of features (principal components). As a successful example of recognition using the principal component analysis, Eigenface recognition has widely been known. This has been proposed by M. Turk and A. Pentland in "Eigenfaces for Recognition" (Journal of Cognitive Neuroscience, vol. 3, No. 1, 1991). Their uniqueness lies in that co-occurrence matrices are regarded as a facial image.

Specifically, according to the present invention, an Eigen co-occurrence matrix set determination step, a profiling co-occurrence matrix conversion step, a reference feature vector extraction step, a testing co-occurrence matrix conversion step, a testing feature vector extraction step, a reference approximate co-occurrence matrix acquisition step, a reference layered network model construction step, a testing approximate co-occurrence matrix acquisition step, a testing network model construction step, and a determination step are performed in addition to the window data decomposition step, the scope data extraction step, and the co-occurrence matrix conversion step.

At the Eigen co-occurrence matrix set determination step, one or more Eigen co-occurrence matrix sets, which are a basis for obtaining feature vectors, are determined by principal component analysis using the plurality of co-occurrence matrices as input. At the profiling co-occurrence matrix conversion step, one or more profile-learning sequential data belonging to one ore more categories are converted into one or more profiling co-occurrence matrices by performing steps equivalent to the window data decomposition step, the scope data extraction step and the co-occurrence matrix conversion step upon one or more profile-learning sequential data. At the reference feature vector extraction step, one or more reference feature vectors are extracted in respect of one or more profile-learning sequential data, based on the one or more profiling co-occurrence matrices and the one or more Eigen co-occurrence matrix sets. At the testing co-occurrence matrix conversion step, testing sequential data to be tested are converted into a testing co-occurrence matrix by performing steps equivalent to the window data decomposition step, the scope data extraction step and the co-occurrence matrix conversion step upon the testing sequential data to be tested. At the testing feature vector extraction step, a testing feature vector is extracted in respect of the testing sequential data to be tested, based on the testing co-occurrence matrix and the one or more Eigen co-occurrence matrix sets.

At the reference approximate co-occurrence matrix acquisition step, a plurality of reference approximate co-occurrence matrices having a dimensionality reduced from that of the plurality of Eigen co-occurrence matrices are acquired based on multiplication of the reference feature vectors and the plurality of Eigen co-occurrence matrices forming the one or more Eigen co-occurrence matrix sets. At the reference layered network model construction step, a reference layered network model is constructed from extracting one or more events from the plurality of reference approximate co-occurrence matrices. At the testing co-occurrence matrix acquisition step, a plurality of testing approximate co-occurrence matrices having a dimensionality reduced from that of the plurality of Eigen co-occurrence matrices are acquired based on multiplication of the testing feature vector and the plurality of Eigen co-occurrence matrices forming the one or more Eigen co-occurrence matrix sets. At the testing layered network model construction step, a testing layered network model is constructed by extracting one or more events from the plurality of testing approximate co-occurrence matrices.

After each of the above-mentioned steps has been performed, at the determination step, it is determined whether or not the testing sequential data to be tested belong to the one or more categories based on the reference layered network model and testing layered network model. According to the method of the present invention, data examination can be done with higher accuracy than the method proposed by the inventors prior to the present invention.

For example, at the determination step, it can be determined whether or not the testing sequential data to be tested belong to the one or more specified categories, based on the similarity between the reference layered network model and testing layered network model. In this case, at the determination step, it is preferably determined whether or not the testing sequential data to be tested belong to the one or more categories or any one of categories by examining if the similarity exceeds a predetermined threshold. The reference layered network model and testing layered network model may be each constituted by a network model including positive co-occurrence values and a network model including negative co-occurrence values. In this case, at the determination step, the similarity may be calculated using at least one of the network model including the positive co-occurrence values and the network model including the negative co-occurrence values. The positive network represents stronger features than those of the mean co-occurrence matrix of the co-occurrence matrix sets used for generating the one or more Eigen co-occurrence matrix sets. The negative network represents weaker features than those of the mean co-occurrence matrix. Since determination can be made in two viewpoints when using both network models, positive and negative, determination accuracy can be further increased.

When the method of the present invention is applied to sequential data entered into a computer system, anomalous sequential data can be identified more accurately than ever.

BEST MODE FOR IMPLEMENTING THE INVENTION

Figure 1:
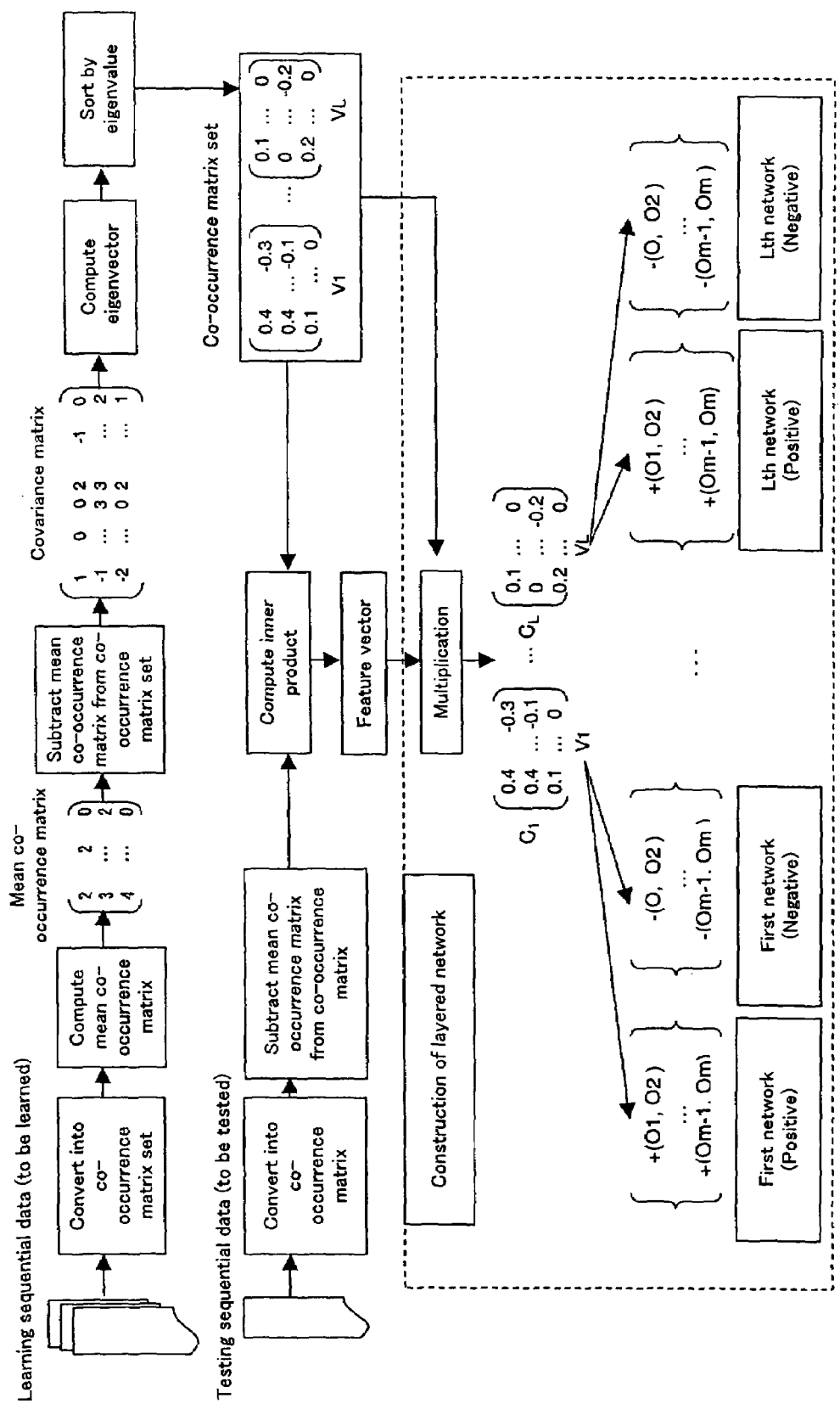
FIG. 1 shows a program configuration applied to a computer system for implementing one embodiment of the present invention, wherein the principal component analysis is used to determine whether or not sequential data including a plurality of types of events belong to one or more specified categories.

With reference to the accompanying drawings, an embodiment of the present invention will be described below. FIG. 1 shows a program configuration used in a computer system for implementing one embodiment of the present invention, wherein principal component analysis is used to determine whether or not sequential data including a plurality of types of events belong to one or more specified categories. Specifically, it shows the process until feature vectors are obtained in the program. The basic process until the feature vectors are obtained has been disclosed by the inventors of the present invention in Non-patent Document 11. In FIG. 1, learning sequential data to be learned for obtaining one or more Eigen co-occurrence matrix sets to be used for obtaining feature vectors, profile-learning sequential data for learning the profile of a user, and testing sequential data to be tested are converted into co-occurrence matrices. A co-occurrence matrix refers to matrix data converted from the correlation between events of two types included in a plurality of types of events within a sequence (sequential data).

Figure 2:
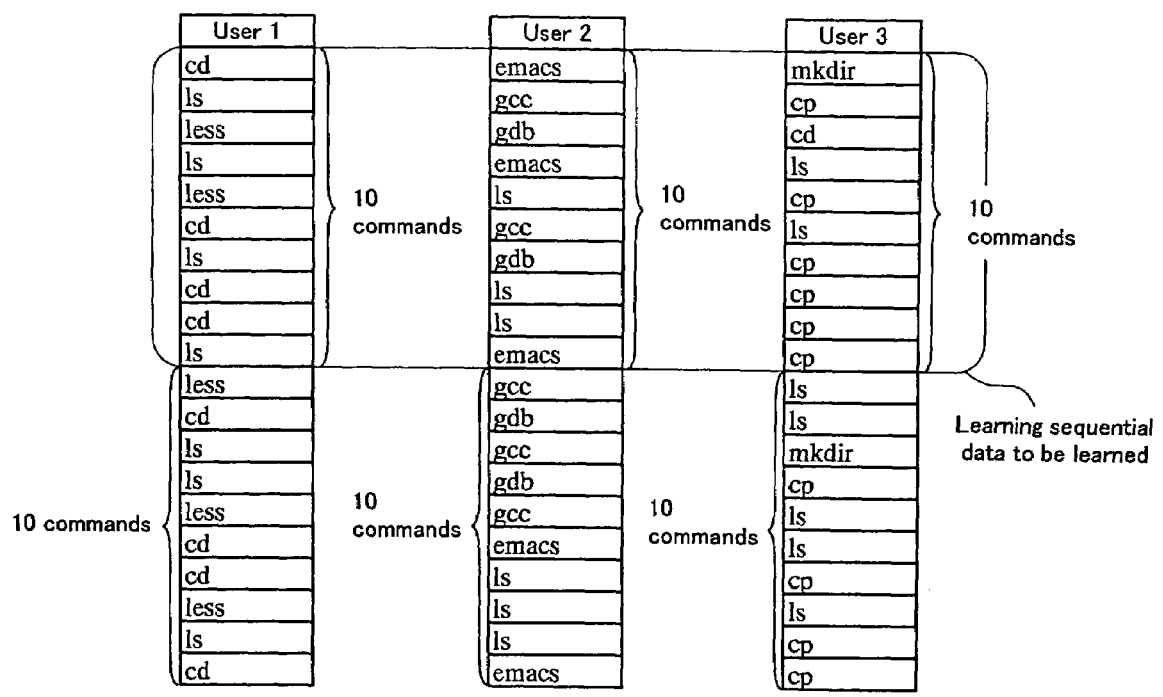
FIG. 2 shows an example of three sets of sequential data transmitted respectively from three users, User1, User2, and User3.

Now, a step of converting the sequential data into co-occurrence matrices will be described. FIG. 2 shows an example of a plurality of learning sequential datasets to be learned, in this case, three sets of sequential data transmitted respectively from three users, User1, User2, and User3, who are individuals or other computers transmitting sequential data by access to the computer. In this example, the sequential data from each user consist of twenty (20) commands (events). As described later, in this embodiment, the sequential data of twenty commands are decomposed into windows having ten (10) commands (data length) (window data decomposition step). At the window data decomposition step, each sequential data are decomposed into two window data having a predetermined data length (equivalent to the data length of ten commands). The data length of the window data may be determined depending upon the length of the sequential data.

Next, the window data are converted into co-occurrence matrices in order to represent the causality or correlation between two events appearing within a sequence or a certain part of the sequential data. Each element of the co-occurrence matrix represents the strength of the correlation between two events. In generating a co-occurrence matrix, the window size is defined as w, scope size as s, and event set as $B=\{b1, b2, b, \ldots, bm\}$ where m stands for the number of events. The window size w determines the size of event time series from which one feature vector is extracted. The scope size s determines the distance (width) over which the causality between two events is considered. In the datasets shown in FIG. 2, w is defined as ten (10) and s as six (6). B is defined as eight (8) unique commands (events) appearing in the learning sequential data to be learned (which are also called as domain data) of the respective three users where m=8. These eight commands are cd, ls, less, emacs, gcc, gdb, mkdir and cp. The strength of the causality or correlation between two events is defined by the distance between the two events and frequency of occurrences of the two events. Specifically, the strength of the causality between events is defined by counting how many times events focused on appear within the scope size (6) in the window size (10). In the example shown in FIG. 2, two co-occurrence matrices are generated for each user. In Window 1 of FIG. 3, the number of elements or frequency of occurrences of events cd and ls is seven (7), which indicates that event ls appears seven times after event cd within the scope size (6) in the window size (10). Event pairs (cd ls) and (ls cd) have the largest number of elements or highest frequency of occurrences in Window 1 of FIG. 3. This indicates that these events have a strong correlation in the sequential data. Thus, the co-occurrence matrix represents the strength of the causality or correlation between every event pair (two events) appearing in the sequential data.

Figure 3:
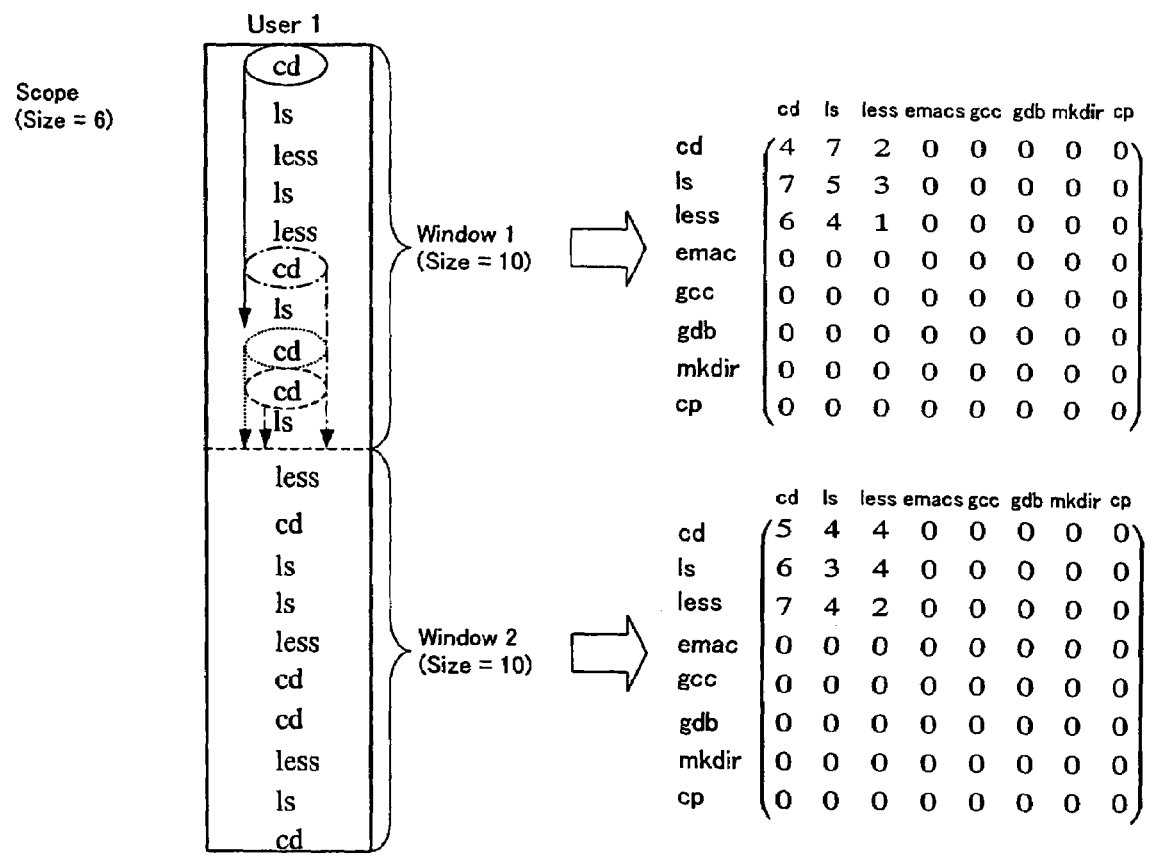
FIG. 3 is an illustration used for describing co-occurrence matrix conversion.

In relation to the present invention, FIG. 3 will be described in detail. As shown in FIG. 3, a plurality of scope data are extracted from the above-mentioned window data for the sequential data of each user (scope data extraction step). At this step, a plurality of scope data having a data length shorter than that of the window data are lag sequentially extracted or sequentially extracted with a time lag from the window data. In this example, scope data having a data length corresponding to six commands are sequentially extracted. Specifically, one or more scope data are extracted in respect of an event of one type, relative to a position (reference position) at which the event of that one type (e.g. cd), which has been selected from a plurality of types of events included in ten commands constituting the window data, is included in the window data. In the example shown in FIG. 3, when focus is placed on event cd, six commands (events) not including but after event cd (reference position) appearing at the top of window 1, are extracted as the first scope data. Then, six commands (events) not including but after event cd appearing sixth from the top of window 1 are extracted as the second scope data. Note that four commands are extracted as the second scope data since window 1 includes ten events in FIG. 3. Likewise, the third and fourth scope data are extracted respectively relative to the eighth and ninth event cd appearing from the top of the window data.

Next, based on a plurality of scope data extracted from the window data, the strength of time series correlations between a plurality of types of events included in that window data (the correlational strength between an event pair or two events) is represented as the frequency of occurrences of that event pair and the distance between the paired events. For example, in respect of one type of an event cd, the sum of the numbers of events of this one type (cd of the same type in FIG. 3) included in one or more scope data (four scope data in FIG. 3) is defined as the frequency of occurrences of the event of that one type relative to the same event of the one type. This frequency of occurrences is converted into a value indicating the strength of the correlation between the event pair. Thus, the window data are converted into co-occurrence matrices. In the example shown in FIG. 3, the correlation between an event cd and another event cd in window 1 is considered as the frequency of occurrences. The above-mentioned first scope data include one cd. The second scope data include two cd's. The third scope data include one cd, and the fourth scope data include no cd. Therefore, the frequency of occurrences of event cd relative to event cd is calculated as 1+2+1+0=4. Likewise, looking at the correlation between event cd and event ls, the above-mentioned first scope data include three ls's, and the second scope data include two ls's. The third scope data include one ls and the fourth scope data include one ls. Therefore, the frequency of event ls relative event cd is calculated as 3+2+1+1=7. When the scope data are set, these frequencies include time and distance, namely, dynamic information included in the sequential data. The right-side area of FIG. 3 shows matrix data of the co-occurrence matrices converted from windows 1 and 2. Thus, when the sequential data is represented as a co-occurrence matrix, modeling of dynamic human behavior becomes possible.

When using the method of the present invention to identify an authorized user and masquerader or spoofer, a co-occurrence matrix is handled as a pattern, and principal component analysis is used as a statistical feature extraction method to obtain feature vectors. Then, the obtained feature vectors are utilized for identification. The principal component analysis is a statistical feature extraction method which enables representation of vector-type data as a small number of features (principal components). In other words, the principal component analysis is a technique by which statistical data in a form of many variables are transformed into new linear combination variables. This technique summarizes a number of correlated variables into a smaller number of uncorrelated variables, namely, principal components. In the embodiment of the present invention, the co-occurrence matrices are regarded as a facial image constructed from Eigenfaces proposed by Turk et al. as mentioned before.

As shown in FIG. 1, learning sequential data to be used for generating one or more Eigen co-occurrence matrix sets are extracted from the sequential data and such data are defined as domain data. A co-occurrence matrix converted from one window data is regarded as a facial image in the Eigenface technique proposed by M. Turk et al. Then, the co-occurrence matrix is generated corresponding to the Eigenface. Eigenvalues and their corresponding Eigenfaces are obtained by principal component analysis. The eigenvalues are sorted in the descending order. Then, out of the corresponding eigenvectors, N eigenvectors are selected from the top and converted into co-occurrence matrices, which are defined as an Eigen co-occurrence matrix set.

Following the steps shown below, feature vectors are extracted from the co-occurrence matrices by principal component analysis. First, out of p learning co-occurrence matrices obtained from the learning sequential data to be learned, the ith co-occurrence matrix is represented as an N-dimensional vector xi where values of the respective elements are arranged. p stands for the number of samples and N for a square of the number of events. The mean vector for p co-occurrence matrices is computed as a mean co-occurrence matrix with the following expression (1). The mean co-occurrence matrix shows the correlation between two events (event pair).

$$\bar{x} = \frac{1}{p}\sum_{i=1}^{p} x_i \quad (1)$$

A vector obtained by subtracting the mean co-occurrence matrix from each of the co-occurrence matrices is represented as follows.

$$\tilde{x}_i = x_i - \bar{x} \quad (2)$$

Subtraction of the mean co-occurrence matrix is intended to set the coordinate axis at the origin. The mean co-occurrence matrix (m×m matrix) is subtracted from each co-occurrence matrix. Then, the resulting co-occurrence matrices are vectorized or transformed into vectors. Namely, an m×m matrix is converted into an $m^2$-dimensional column vector in which elements are vertically arranged. A set of the resulting co-occurrence matrices is represented by the following expression (3).

$$\tilde{X} = [\tilde{x}_1, \ldots, \tilde{x}_p] \quad (3)$$

A matrix obtained by multiplying this matrix and a transposed matrix is a covariance matrix ($m^2 \times m^2$ matrix) shown in FIG. 1.

Next, an orthonormal basis a for optimal approximation of the set of learning co-occurrence matrices is constructed from the eigenvectors of the covariance matrix obtained above. For this purpose, the eigenvalues and eigenvectors are computed from the covariance matrix, namely, the eigenvectors are computed from the $m^2 \times m^2$ matrix. An eigenvalue represents the strength of a feature. An eigenvector represents a feature axis uncorrelated to another feature axis represented by another eigenvector. Each eigenvector al of the orthonormal basis a is defined as an Eigen co-occurrence matrix and a set of Eigen co-occurrence matrices is called as an Eigen co-occurrence matrix set (principal component).

Specifically, the eigenvalues are sorted in the descending order and then their corresponding eigenvectors are obtained. Out of $m^2$ eigenvectors, only L eigenvectors are selected. By sorting the eigenvectors by eigenvalue, it is possible to select stronger feature axes in order from the strongest one. L eigenvectors are respectively converted into matrices, namely, $m^2$-dimensional matrices are converted into m×m matrices. These m×m matrices are defined as an Eigen co-occurrence matrix set. The inner product or dot product is computed for the orthonormal basis a and the co-occurrence matrix X in which feature vectors (A) (or principal component score C) for the co-occurrence matrix x are vertically arranged to form column vectors. The respective components of the feature vector, $c_1, c_2, \ldots c_L$ represent the contribution rates of the respective Eigen co-occurrence matrices for representing the co-occurrence matrix x. As is the case with the embodiment of the present invention, when the feature vectors are extracted from the co-occurrence matrices, various vector space techniques can be employed to identify the feature vectors.

Now, the determination step of the sequential data examination method according to the present invention will be described below. The sequential data examination method of the present invention comprises the steps of the window data decomposition step used in the co-occurrence matrix conversion mentioned above, the above-mentioned scope data extraction step, and the above-mentioned co-occurrence matrix conversion step. The method further comprises an Eigen co-occurrence matrix set determination step, a profiling co-occurrence matrix conversion step, a reference feature vector extraction step, a testing co-occurrence matrix conversion step, a testing feature vector extraction step, a reference approximate co-occurrence matrix acquisition step, a reference layered network model construction step, a testing approximate co-occurrence matrix acquisition step, a testing layered network model construction step, and a determination step.

At the Eigen co-occurrence matrix set determination step, as described before, one or more Eigen co-occurrence matrix sets (a set of Eigen co-occurrence matrices, namely, principal components), which are a basis for obtaining feature vectors, are determined by principal component analysis using a plurality of co-occurrence matrices (converted from the learning sequential data to be learned) as input.

At the profiling co-occurrence matrix conversion step, one or more profile-learning sequential data belonging to one or more categories are converted into one or more profiling co-occurrence matrices by performing steps equivalent to the window data decomposition step, the scope data extraction step and the co-occurrence matrix conversion step upon one or more profile-learning sequential data. As the profile-learning sequential data, such sequential data are used as have been clearly or evidently identified to be created by an authorized user. It is a matter of course to select the profile-learning sequential data from the learning sequential data to be learned. Suppose 100 users access a certain computer. Then, sequential data evidently created by these 100 users are used as the profile-learning sequential data for each user and are respectively converted into profiling co-occurrence matrices.

Next, at the reference feature vector extraction step, one or more reference feature vectors are extracted correspondingly to respective profile-learning sequential data, based on the one or more profiling co-occurrence matrices and the one or more Eigen co-occurrence matrix sets. The one or more reference feature vectors thus obtained are pre-stored in a memory of the computer. In FIG. 1, the profile-learning sequential data are not depicted. The profile-learning sequential data are converted into co-occurrence matrices in the same manner as the testing sequential data, and one or more feature vectors are obtained from the co-occurrence matrices.

Next, at the testing co-occurrence matrix conversion step, testing sequential data to be tested are converted into a testing co-occurrence matrix by performing steps equivalent to the window data decomposition step, the scope data extraction step and the co-occurrence matrix conversion step upon the testing sequential data to be tested. At the testing feature vector extraction step, a testing feature vector is extracted in respect of the testing sequential data to be tested, based on the testing co-occurrence matrix and the one or more Eigen co-occurrence matrix sets. As shown in FIG. 1, when the testing feature vector is extracted, an inner product is computed for the vectorized testing co-occurrence matrix with the mean co-occurrence subtracted and the vectorized Eigen co-occurrence matrix set obtained above.

Figure 4:
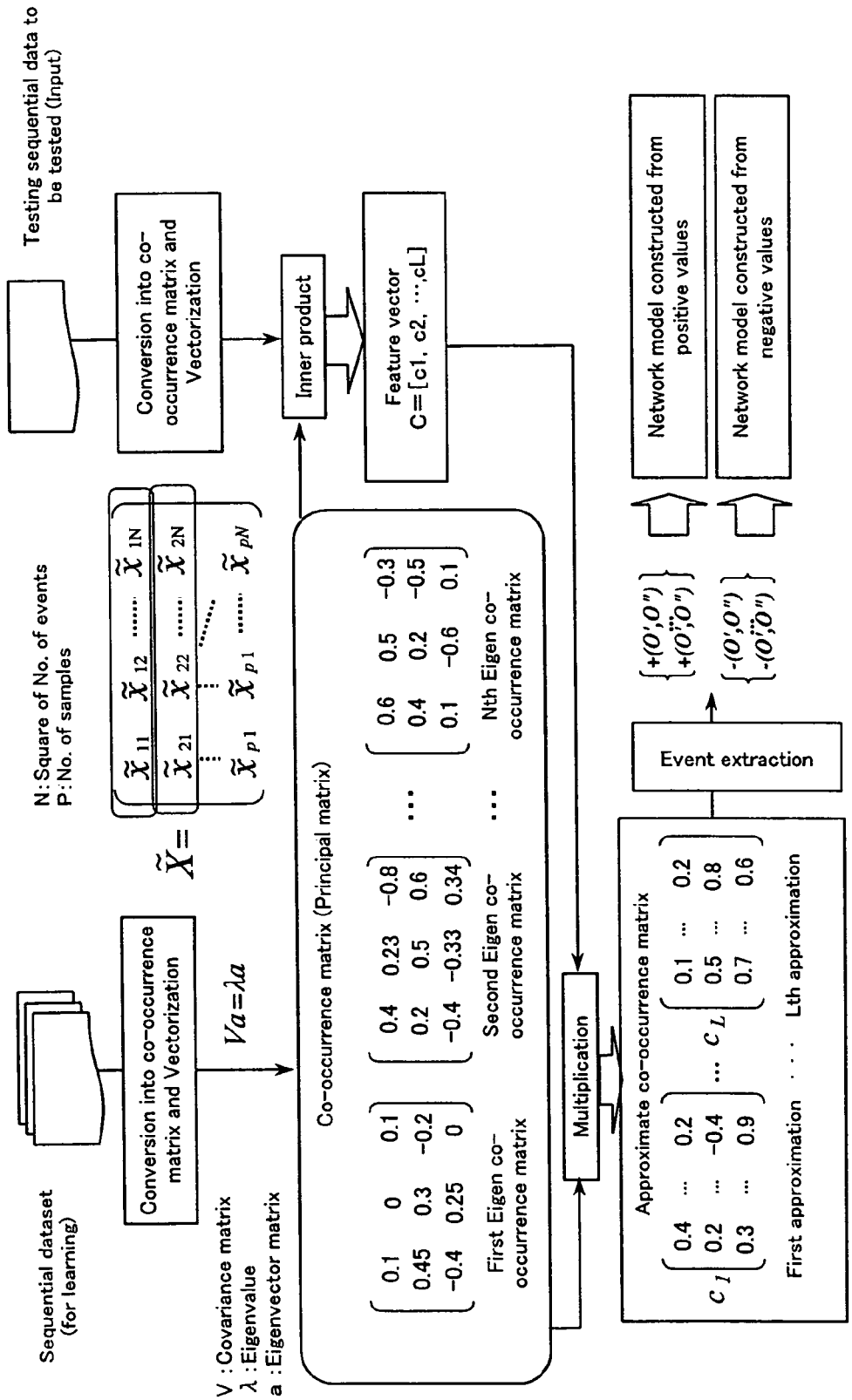
FIG. 4 is a block diagram showing a part of the program for implementing the determination step of the present invention.

FIG. 4 is a block diagram showing a part of the flowchart of the program for implementing the determination step in the embodiment according to the present invention. The process until each feature vector is obtained has been illustrated in FIG. 1. Before performing the determination step, the reference approximate co-occurrence matrix acquisition step, the reference layered network model construction step, the testing approximate co-occurrence matrix acquisition step, and the testing layered network model construction step are performed based on the reference feature vector pre-stored in the computer memory and testing feature vector.

At the reference approximate co-occurrence matrix acquisition step, a plurality of reference approximate co-occurrence matrices (the first to Lth Eigen co-occurrence matrices where L is a positive integer) are acquired, based on multiplication of the one or more reference feature vectors and a plurality of Eigen co-occurrence matrices forming the one or more Eigen co-occurrence matrix sets. At the reference layered network model construction step, a reference layered network model is constructed by extracting one or more events from the reference approximate co-occurrence matrices (the first to Lth approximate Eigen co-occurrence matrices). Event extraction means setting of a threshold h, and constructing a positive network model using values higher than the threshold h, or a negative network model using values lower than the negative threshold –h. In FIG. 4, two matrices shown after "Event Extraction" are respectively a positive layered network model and negative layered network model.

Likewise, at the testing approximate co-occurrence matrix acquisition step, a plurality of testing approximate co-occurrence matrices are acquired, based on multiplication of the testing feature vector and a plurality of Eigen co-occurrence matrices (the first to Lth co-occurrence matrices) forming the one or more Eigen co-occurrence matrix sets. At the testing layered network model construction step, a testing layered network model is constructed by extracting one or more events from a plurality of testing approximate co-occurrence matrices.

The process of constructing the layered network model will be more specifically described. First, by reducing the dimensionality (the number of elements) of Eigen co-occurrence matrix $L(L=1, \ldots, N)$, the original co-occurrence matrix is represented as a matrix having a lower dimensionality in expression 4 using the Eigen co-occurrence matrix a and feature vector C.

$$\hat{x} = \sum_{i=1}^{L} c_i a_i \text{ for } (L = 1, \cdots, N) \quad (4)$$

The ith co-occurrence matrix is generated using expression 5 as shown below. The ith network is extracted. Thus, a layered network can be represented. Matrix $Z_i$ represented in expression 5 is called as an approximate co-occurrence matrix. When the Eigen co-occurrence matrix set is defined as $a_1, a_2, a_L$ and the feature vector as $c_1, c_2 \ldots c_L$, the first (1) approximate network is obtained from $c_1 \times a_1$, the second (2) approximate network from $c_1 \times a_1 + c_2 \times a_2$, and the Lth approximate network from $Sc_i \times a_i$. In summary, when the Eigen co-occurrence matrix set is defined as $a_1, a_2, \ldots a_L$ and the feature vector as $c_1, c_2, \ldots, c_L$, the ith layer of a layered network is a network obtained from a matrix of $a_i \times c_i$ generated by multiplying the corresponding Eigen co-occurrence matrix $a_i$ and feature vector $c_i$.

$$z_i = c_i a_i \text{ for } (i=1, \ldots, N) \quad (5)$$

Each layer network is not a subnetwork of the original co-occurrence matrix, but a complete network generated from the Eigen co-occurrence matrix.

As shown in expression 6, matrix $Z_i$ is divided into positive elements x(i) and negative elements y(i). The positive and negative elements can respectively form a network.

$$z_i = c_i a_i = x(i) + y(i) \text{ for } (L=1, \ldots, N) \quad (6)$$

Figure 5:
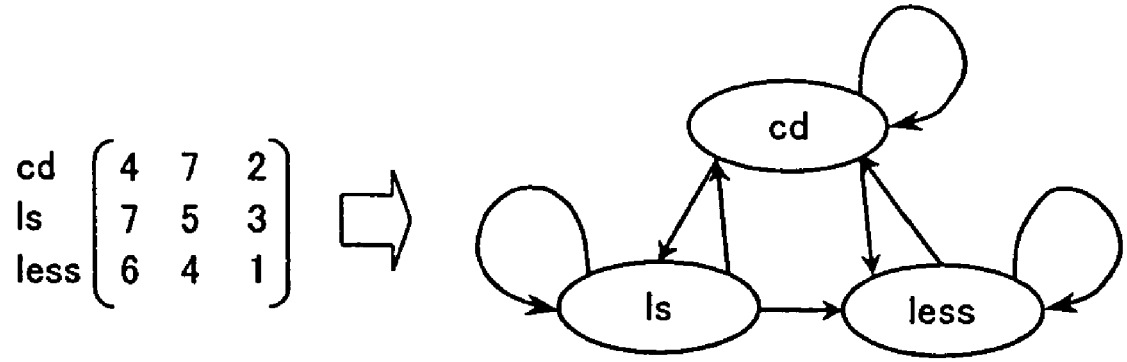
FIG. 5 shows a network construction represented from one co-occurrence matrix.

A network resulting from a matrix x(i) consisting of positive elements shows positive co-occurrence and contributes to reconstruction of a matrix (input-mean). On the other hand, a network resulting from a matrix y(i) consisting of negative elements shows negative co-occurrence and contributes to reconstruction of a matrix (input-mean). The above-mentioned layered network construction technique is performed for construction of both a reference layered network model and testing layered network model. When a co-occurrence matrix is regarded as adjacent matrices, a network construction can be extracted from this co-occurrence matrix. FIG. 5 shows one example of a network construction resulting from one co-occurrence matrix. Such network construction can improve a detection rate when the determination step is performed.

At the determination step to be performed after the above-mentioned steps, it is determined whether or not the testing sequential data to be tested belong to the one or more categories, based on the reference layered network model and the testing layered network model. Specifically, for example, it is determined whether or not the testing sequential data to be tested belong to the one or more categories or any one of categories, based on a similarity between the reference layered network model and the testing layered network model. In this case, it is determined whether or not the testing sequential data to be tested belong to any one of two categories by examining if the similarity exceeds a predetermined threshold.

The similarity between the reference layered network model and testing layered network model is calculated as follows: the number of subnetworks that the corresponding layer network models have in common is calculated for the respective layers of both models, supposing that a network consisting of E edge or edges is defined as one subnetwork, and then the sum of the numbers of subnetworks, which the corresponding layers of both models have in common, is defined as the similarity between the two models.

Figure 6:
FIG. 6 shows subnetwork examples, one of which has one edge and the other has two edges.
Figure 6:
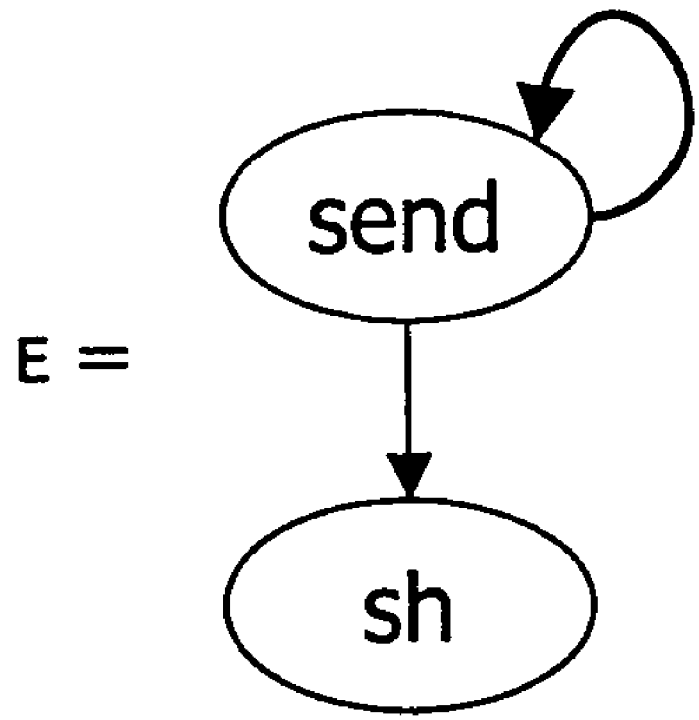
Figure 7:
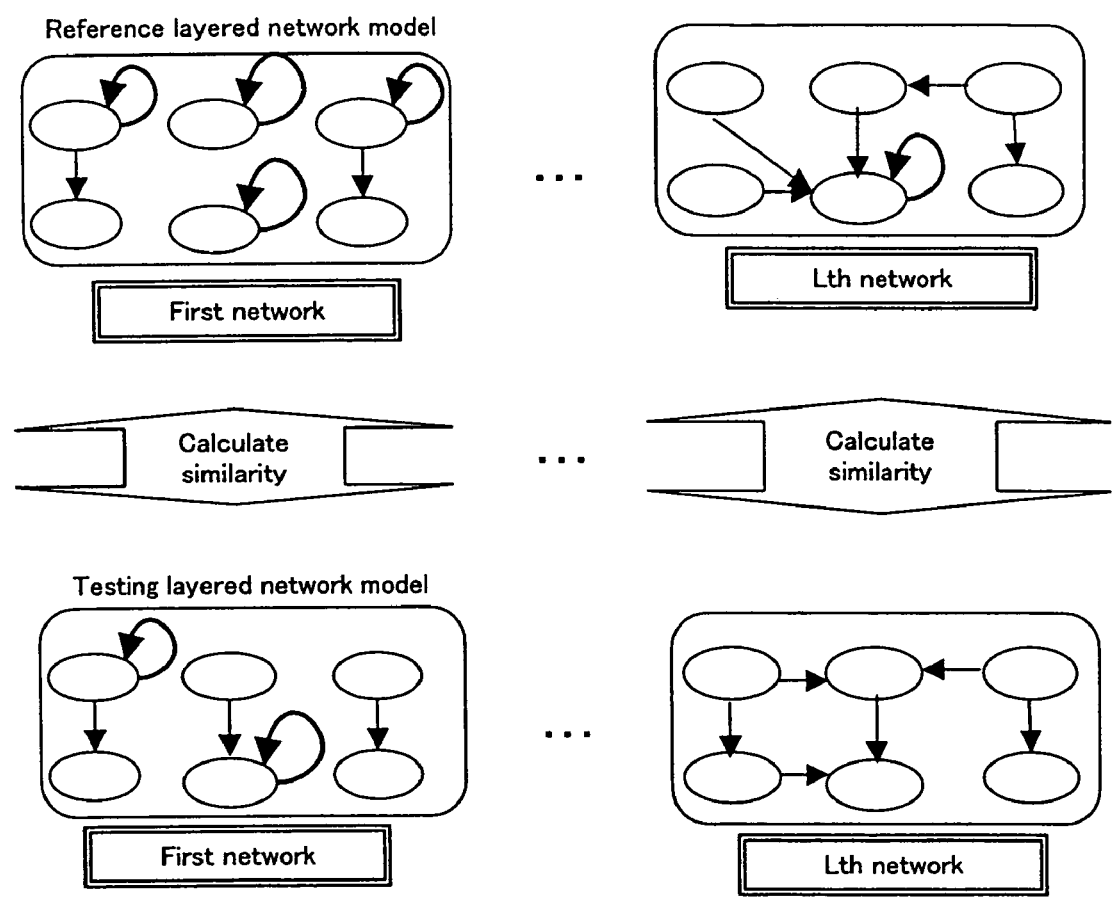
FIG. 7 shows similarities are calculated between corresponding layers.
Figure 8:
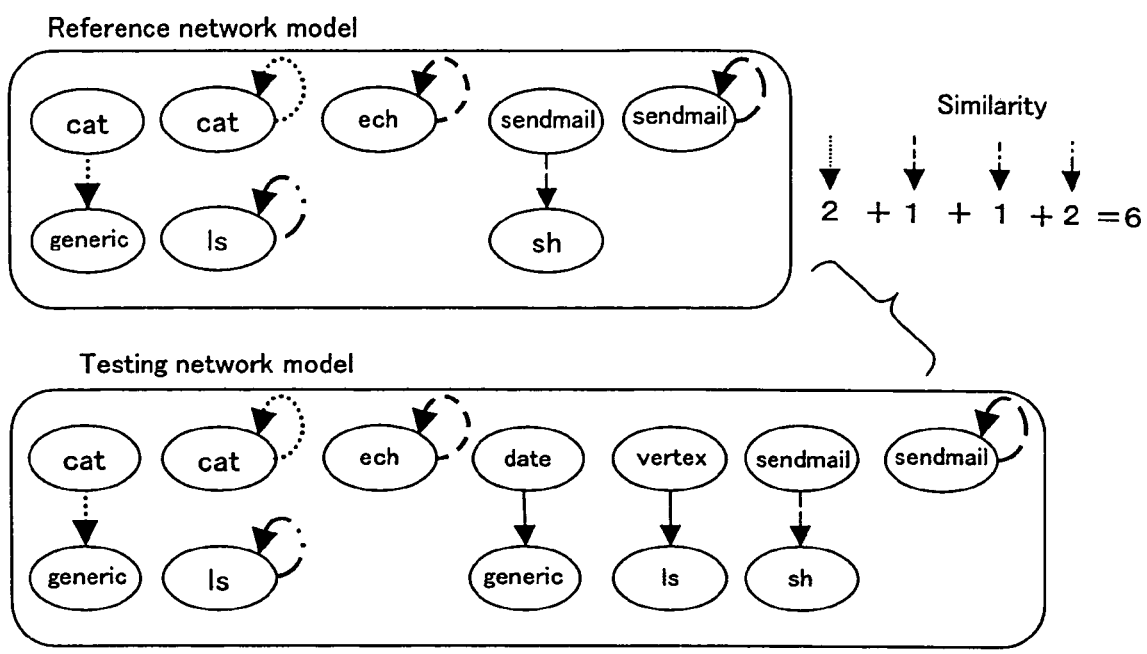
FIG. 8 shows an example of similarity calculation between one pair of a reference network model and testing network model.

FIG. 6 shows subnetwork examples, one of which has one edge (E=1: one arrow of one type) and the other has two edges (E=2: two arrows of one type). As shown in FIG. 7, the reference layered network model has the first to Lth layer networks. The input (testing) layered network model also has the first to Lth layer networks. The similarity is calculated between two models by counting the number of subnetworks that the corresponding layers of both models have in common. FIG. 8 shows an example of similarity calculation on one layer between one pair of a reference network model and testing network model. In this example, the similarity is calculated by counting the numbers of subnetworks that two models have in common, supposing E=1. In FIG. 8, edges are represented by arrows of four types of dotted lines and arrows of solid line. Two models shown in the figure have in common two arrows of the first type, one arrow of the second type, one arrow of the third type, and two arrows of the fourth type. Since six subnetworks are common between the two models, the similarity is defined as six (6).

The inventors of the present invention have carried out an experiment wherein a program for implementing the method of the above-mentioned embodiment is installed in an anomaly detection system and sequential log data of actual UNIX (registered trademark) commands are examined to identify the user as an authorized user or masquerader. Now, the results of the experiment will be described below. In the experiment, the inventors used the dataset of UNIX (registered trademark) commands provided by Schonlau et al. (M. Schonlau, W. Dumonchel, W. H. Ju, A. F. Karr, M. Theus, and Y. Cardi; "Computer intrusion: Detecting masquerades"; Statistica Science, vol. 16, no. 1, pp. 58-74, 2001). The dataset provided by Schoulau et al. includes data from 50 users with 15,000 UNIX (registered trademark) commands recorded for one user. Due to privacy reasons, the dataset do not include information on arguments, flags, and aliases for the recorded commands. Out of 15,000 commands, the first 5,000 commands are created by authorized users and the masquerading commands are inserted into the remaining 10,000 commands. In the experiment, the first 5,000 commands are used as learning sequential data to be learned and the remaining 10,000 commands as testing sequential data to be tested.

The 5,000 learning sequential data are divided into windows having a data length of 100 commands. The ECM method is used to extract features from the respective window data. The Eigen co-occurrence matrices are generated using the learning sequential data of all of 50 users (50×50=2,500 windows). The eigenvalues are sorted in the descending order. Then, the 50 eigenvectors corresponding to the first 50 eigenvalues are selected and defined as the Eigen co-occurrence matrices (L=50).

For the learning sequential data of each user, a window unit is defined as 100 commands. According to the method of the above-mentioned embodiment of the present invention, the learning sequential data for each user are converted into a network model.

For testing sequential data of each user, a window unit is defined as 100 commands. Also, according to the method of the above-mentioned embodiment of the present invention, the testing sequential data for each user are converted into a network model.

The learning network model set is defined as S. Then, the similarity is calculated between the network model S and a network model of the testing data $seq_i$ for identifying the testing data as normal or anomalous. The similarity between the learning data S and $seq_i$ is represented in expression 7.

This similarity is the highest among similarities of the respective network models resulting from the learning data.

$$Sim(seq_i, S) = \max_{seq_j \in S}\{Sim(seq_i, seq_j)\} \quad (7)$$

The similarity of the network model is defined as expression 8.

$$Sim(seq_i, seq_j) = \sum_{k}^{N} \delta(T_k(i), T_k(j)) \quad (8)$$

$T_k(x)$ stands for a network model for the kth layer of a layered network model generated from $seq_x$. $\delta(T_k(i),T_k(j))$ denotes the sum of the numbers of subnetworks that network models $T_k(i)$ and $T_k(j)$ have in common in their corresponding layers. A network model for each layer is constructed from 30 nodes selected from the top of the corresponding approximate co-occurrence matrices sorted in the descending order. Two networks connected at their edges are regarded as one subnetwork.

For each user i, a threshold ∈i is set for the similarity based on which the to-be-testes data $seq_i$ is identified as "normal" or "anomalous". If $Sim(seq_i,S)$ is larger than the threshold ∈i, the data is identified as normal. If it is smaller than the threshold ∈i, the data is identified as anomalous. The correct detection rate (which indicates how many percentages anomalous behavior is identified as anomalous) and false detection rate (which indicates how many percentages normal behavior is identified as anomalous or anomalous behavior as normal) vary with the setting of the threshold ∈i.

The experiment has been evaluated by illustrating the results with Receiver Operating Characteristic (ROC) curves. The ROC curve is a graph indicating the system precision by plotting the results obtained from the varied settings of the threshold with correct detection shown on the y-axis and false detection shown on the x-axis. The closer to the upper left side the plotting symbols are, the lower the false detection rate is and the higher the correct detection rate is. This means high performance.

Figure 9:
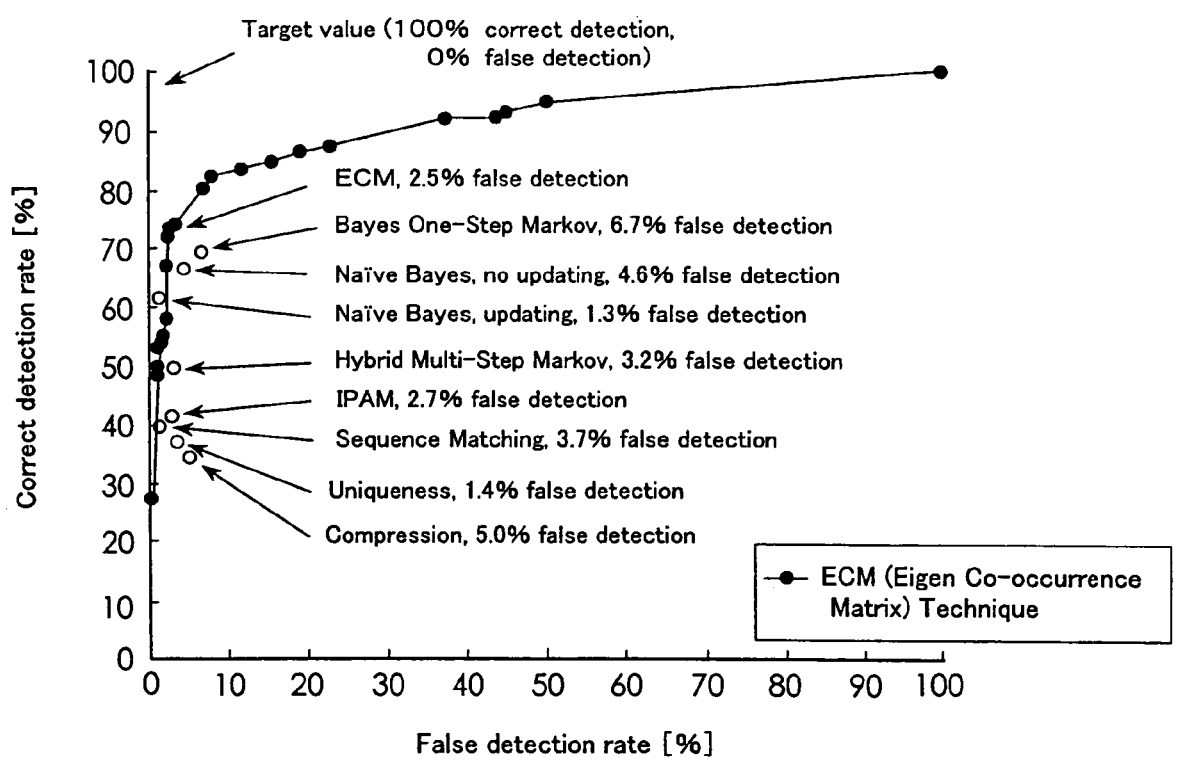
FIG. 9 shows the relationship between correct detection and false detection in an experiment.

In comparison with the present invention, Schonlau et al. (M. Schonlau, W. Dumonchel, W. H. Ju, A. F. Karr, M. Theus, and Y. Cardi; "Computer intrusion: Detecting masquerades"; Statistica Science, vol. 16, no. 1, pp. 58-74, 2001) and Maxion et al. (R. A. Maxion and T. N. Townsend; "Masquerade Detection Using Truncated Command Lines"; roc. International Conference on Dependable Systems and Networks (DSN-02), pp. 219-228, Washington, 2002) applied techniques called Bayes 1-Step Markov, IPAM, Uniqueness, Sequence-Match, Compression, and Naive Bayes to the same dataset as the one used in the experiment carried out by the inventors of the present invention. FIG. 9 shows the experiment result consolidated from the experimental data obtained for 50 users with the varied settings of threshold ∈i for each user i, as well as the results of the experiments by Schonlau et al. and Maxion et al. As known from FIG. 9, the ∈ method of the embodiment according to the present invention shows the lowest false detection rate of all the techniques attaining the highest correct detection rate at which anomalous behavior can be identified as anomalous. In FIG. 9, the result with correction detection of 100% and false detection of 100% means that all anomalous data could be detected, but the remaining data (which were normal) were falsely identified as anomalous. Thus, the effectiveness of the present invention could be verified.

Figure 10:
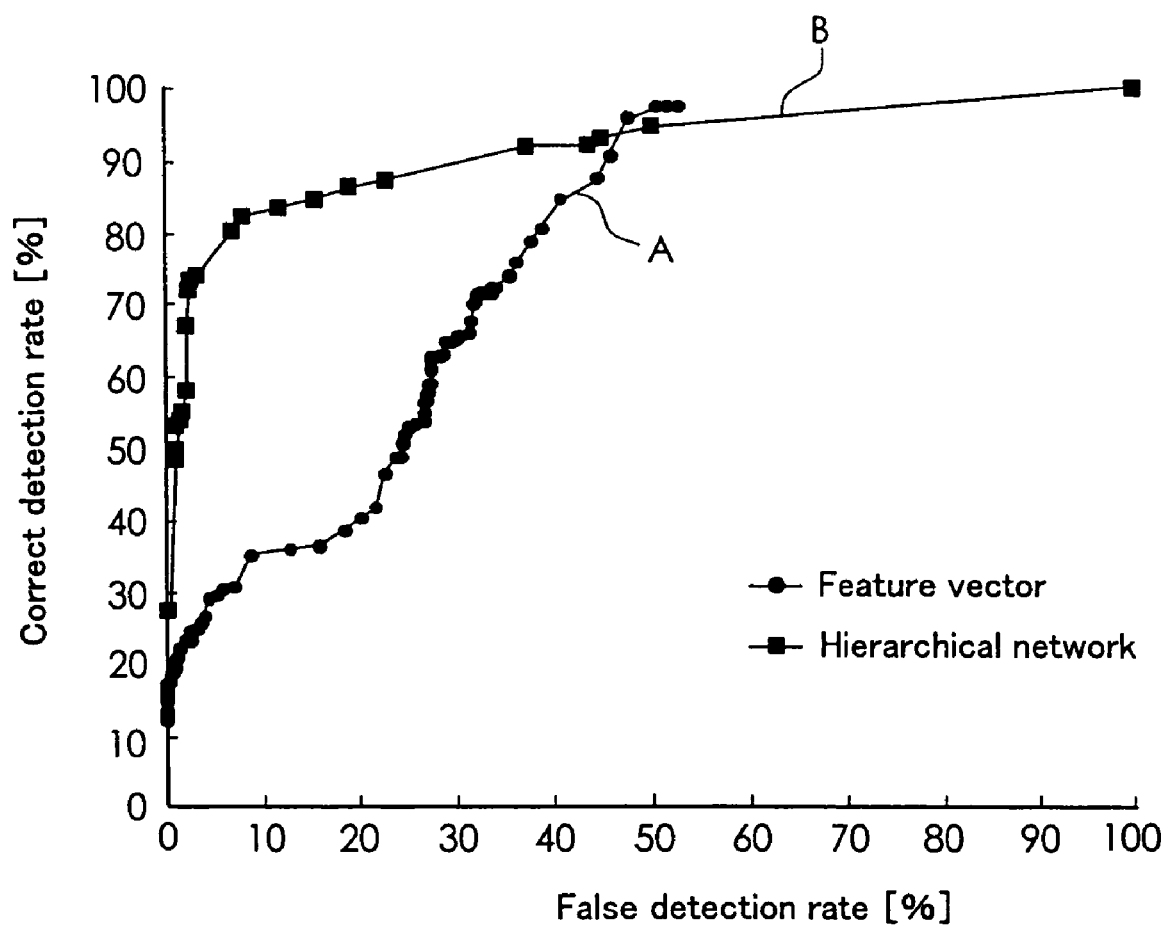
FIG. 10 shows the relationships between correct detection and false detection by determination method.

FIG. 10 shows the correct detection/false detection when the feature vector previously proposed by the inventors is used and the correct detection/false detection when the method of the embodiment according to the present invention is used. In FIG. 10, A indicates the correct detection/false detection when the feature vector is used for detection, and B indicates the correct detection/false detection when the layered network of the embodiment according to the present invention is used for detection. As known from FIG. 10, the method of the embodiment according to the present invention shows higher correct detection and lower false detection than the method using the feature vector.

When the sequential data examination method of the present invention is applied to sequential data entered into a computer system, anomalous sequential data can be identified more accurately than ever.

Further, the present invention is not limited to this embodiment, but variations and modifications may be made without departing from the scope of the present invention.

What is claimed is:

1. A method of examining sequential data by determining whether or not sequential data including a plurality of types of events belong to one or more specified categories, comprising using a computer to execute the steps of:

determining one or more Eigen co-occurrence matrix sets, which are a basis for obtaining feature vectors based on a plurality of learning sequential data, converting one or more profile-learning sequential data belonging to the one or more categories into one or more profiling co-occurrence matrices, extracting one or more reference feature vectors in respect of the one or more profile-learning sequential data, based on the one or more profiling co-occurrence matrices and the one or more Eigen co-occurrence matrix sets, converting testing sequential data to be tested into a testing co-occurrence matrix, extracting a testing feature vector in respect of the testing sequential data, based on the testing co-occurrence matrix and the one or more Eigen co-occurrence matrix sets, acquiring a plurality of reference approximate co-occurrence matrices having a dimensionality reduced from that of the plurality of Eigen co-occurrence matrices, based on the one or more reference feature vectors and the plurality of Eigen co-occurrence matrices forming the one or more Eigen co-occurrence matrix sets, constructing a reference layered network model by extracting one or more events from the plurality of reference approximate co-occurrence matrices, acquiring a plurality of testing approximate co-occurrence matrices having a dimensionality reduced from that of the plurality of Eigen co-occurrence matrices, based on the testing feature vector and the plurality of Eigen co-occurrence matrices forming the one or more Eigen co-occurrence matrix sets, constructing a testing layered network model by extracting one or more events from the plurality of testing approximate co-occurrence matrices, and determining whether or not the testing sequential data to be tested belong to the one or more categories, based on the reference layered network model and the testing layered network model.

2. The method of examining sequential data of claim 1, wherein the step of determining one or more Eigen co-occurrence matrix sets determines whether or not the testing sequential data belong to the one or more categories, based on a similarity between the reference layered network model and the testing layered network model.

3. The method of examining sequential data of claim 2, wherein the step of determining one or more Eigen co-occurrence matrix sets determines whether or not the testing sequential data belong to the one or more categories by examining if the similarity exceeds a predetermined threshold.

4. The method of examining sequential data of claim 3, wherein the reference layered network model and the testing layered network model are each constituted by a network model including one or more positive co-occurrence values and a network model including one or more negative co-occurrence values, and the step of determining one or more Eigen co-occurrence matrix sets calculates the similarity using at least one of the network model including the positive co-occurrence values and the network model including the negative co-occurrence values.

5. The method of examining sequential data of claim 2, wherein the reference layered network model and the testing layered network model are each constituted by a network model including one or more positive co-occurrence values and a network model including one or more negative co-occurrence values, and the step of determining one or more Eigen co-occurrence matrix sets calculates the similarity using at least one of the network model including the positive co-occurrence values and the network model including the negative co-occurrence values.

6. A method of examining sequential data by determining whether or not sequential data including a plurality of types of events belong to one or more specified categories, comprising using a computer to execute the steps of:

decomposing a plurality of learning sequential data into a plurality of window data having a predetermined data length, sequentially extracting, with a time lag, from the window data a plurality of scope data having a data length shorter than the predetermined data length, converting, based on the plurality of scope data, the plurality of window data into a plurality of co-occurrence matrices each indicating a strength of a time series correlation between the plurality of types of events included in the window data, determining one or more Eigen co-occurrence matrix sets, which are a basis for obtaining feature vectors by a statistical feature extraction method using the plurality of co-occurrence matrices as input, converting one or more profile-learning sequential data belonging to the one or more categories into one or more profiling co-occurrence matrices by performing steps equivalent to the step of decomposing into the window data, the step of extracting the scope data, and the step of converting into the profiling co-occurrence matrices, upon the one or more profile-learning sequential data, extracting one or more reference feature vectors in respect of the one or more profile-learning sequential data, based on the one or more profiling co-occurrence matrices and the one or more Eigen co-occurrence matrix sets, converting testing sequential data into a testing co-occurrence matrix by performing steps equivalent to the step of decomposing into the window data, the step of extracting the scope data, and the step of converting into the co-occurrence matrices, upon the testing sequential data, extracting a testing feature vector in respect of the testing sequential data, based on the testing co-occurrence matrix and the one or more Eigen co-occurrence matrix sets, acquiring a plurality of reference approximate co-occurrence matrices having a dimensionality reduced from that of the plurality of Eigen co-occurrence matrices, based on multiplication of the one or more reference feature vectors and the plurality of Eigen co-occurrence matrices forming the one or more Eigen co-occurrence matrix sets, constructing a reference layered network model by extracting one or more events from the plurality of reference approximate co-occurrence matrices, acquiring a plurality of testing approximate co-occurrence matrices having a dimensionality reduced from that of the plurality of Eigen co-occurrence matrices, based on multiplication of the testing feature vector and the plurality of Eigen co-occurrence matrices forming the one or more Eigen co-occurrence matrix sets, constructing a testing layered network model by extracting one or more events from the plurality of testing approximate co-occurrence matrices, and determining whether or not the testing sequential data belong to the one or more categories, based on the reference layered network model and the testing layered network model.

7. The method of examining sequential data of claim 6, wherein the step of determining whether or not the testing sequential data determines whether or not the testing sequential data belong to the one or more categories, based on a similarity between the reference layered network model and the testing layered network model.

8. The method of examining sequential data of claim 7, wherein the step of determining whether or not the testing sequential data determines whether or not the testing sequential data belong to the one or more categories by examining if the similarity exceeds a predetermined threshold.

9. The method of examining sequential data of claim 8, wherein the reference layered network model and the testing layered network model are each constituted by a network model including one or more positive co-occurrence values and a network model including one or more negative co-occurrence values, and the step of determining whether or not the testing sequential data calculates the similarity using at least one of the network model including the positive co-occurrence values and the network model including the negative co-occurrence values.

10. The method of examining sequential data of claim 7, wherein the reference layered network model and the testing layered network model are each constituted by a network model including one or more positive co-occurrence values and a network model including one or more negative co-occurrence values, and the step of determining whether or not the testing sequential data calculates the similarity using at least one of the network model including the positive co-occurrence values and the network model including the negative co-occurrence values.

11. A method of identifying anomalous sequential data entered into a computer system by using a method of examining data by determining whether or not sequential data including a plurality of types of events are anomalous, wherein the method of examining the data comprises using a computer to execute the steps of:

decomposing a plurality of learning sequential data into a plurality of window data having a predetermined data length, sequentially extracting, with a time lag, from the window data a plurality of scope data having a data length shorter than the predetermined data length, converting, based on the plurality of scope data, the plurality of window data into a plurality of co-occurrence matrices each indicating a strength of a time series correlation between the plurality of types of events included in the window data, determining one or more Eigen co-occurrence matrix sets, which are a basis for obtaining feature vectors by a statistical feature extraction method using the plurality of co-occurrence matrices as input, converting one or more profile-learning sequential data belonging to the one or more categories into one or more profiling co-occurrence matrices by performing steps equivalent to the step of decomposing into the window data, the step of extracting the scope data, and the step of converting into the profiling co-occurrence matrices, upon the one or more profile-learning sequential data, extracting one or more reference feature vectors in respect of the one or more profile-learning sequential data, based on the one or more profiling co-occurrence matrices and the one or more Eigen co-occurrence matrix sets, converting testing sequential data into a testing co-occurrence matrix by performing steps equivalent to the step of decomposing into the window data, the step of extracting the scope data, and the step of converting into the co-occurrence matrices, upon the testing sequential data, extracting a testing feature vector in respect of the testing sequential data, based on the testing co-occurrence matrix and the one or more Eigen co-occurrence matrix sets, acquiring a plurality of reference approximate co-occurrence matrices having a dimensionality reduced from that of the plurality of Eigen co-occurrence matrices, based on multiplication of the one or more reference feature vectors and the plurality of Eigen co-occurrence matrices forming the one or more Eigen co-occurrence matrix sets, constructing a reference layered network model by extracting one or more events from the plurality of reference approximate co-occurrence matrices, acquiring a plurality of testing approximate co-occurrence matrices having a dimensionality reduced from that of the plurality of Eigen co-occurrence matrices, based on multiplication of the testing feature vector and the plurality of Eigen co-occurrence matrices forming the one or more Eigen co-occurrence matrix sets, constructing a testing layered network model by extracting one or more events from the plurality of testing approximate co-occurrence matrices, and determining whether or not the testing sequential data belong to the one or more categories, based on the reference layered network model and the testing layered network model.

* * * * *

UNITED STATES PATENT AND TRADEMARK OFFICE
CERTIFICATE OF CORRECTION

PATENT NO. : 7,698,740 B2
APPLICATION NO. : 11/179838
DATED : April 13, 2010
INVENTOR(S) : Oka et al.

Page 1 of 1

It is certified that error appears in the above-identified patent and that said Letters Patent is hereby corrected as shown below:

On the Title Page, item (56), under "U.S. PATENT DOCUMENTS", in Column 2, Line 2, delete "707/1" and insert -- 707/001 --

On Page 2, item (56), under "OTHER PUBLICATIONS", in Column 2, Line 10, delete "D>C." and insert -- D.C. --

Signed and Sealed this

Twenty-second Day of June, 2010

David J. Kappos
*Director of the United States Patent and Trademark Office*